(12) United States Patent
Faivishevsky et al.

(10) Patent No.: US 10,356,649 B2
(45) Date of Patent: Jul. 16, 2019

(54) MULTISENSORY CHANGE DETECTION FOR INTERNET OF THINGS DOMAIN

(71) Applicant: Intel Corporation, Santa Clara, CA (US)

(72) Inventors: Lev Faivishevsky, Kfar Saba (IL); Amitai Armon, Tel-Aviv (IL)

(73) Assignee: Intel Corporation, Santa Clara, CA (US)

( * ) Notice: Subject to any disclaimer, the term of this patent is extended or adjusted under 35 U.S.C. 154(b) by 824 days.

(21) Appl. No.: 14/579,083

(22) Filed: Dec. 22, 2014

(65) Prior Publication Data
US 2016/0095013 A1 Mar. 31, 2016

Related U.S. Application Data

(60) Provisional application No. 62/056,199, filed on Sep. 26, 2014.

(51) Int. Cl.
*H04W 28/02* (2009.01)
*G08C 25/00* (2006.01)
(Continued)

(52) U.S. Cl.
CPC .......... *H04W 28/021* (2013.01); *G08C 25/00* (2013.01); *H04L 67/12* (2013.01); *H04W 28/08* (2013.01); *H04W 84/18* (2013.01)

(58) Field of Classification Search
CPC ... H04W 28/021; H04W 28/08; H04W 84/18; H04W 4/005; G08C 25/00; H04L 67/12; G06F 17/30424
See application file for complete search history.

(56) References Cited

U.S. PATENT DOCUMENTS

| 3,422,414 A | * | 1/1969 | Margreiter | ............. G08C 25/00 327/20 |
| 6,694,285 B1 | * | 2/2004 | Choe | ...................... G01H 1/003 702/182 |

(Continued)

FOREIGN PATENT DOCUMENTS

| CN | 102959401 A | 3/2013 |
| CN | 103868692 A | 6/2014 |

(Continued)

OTHER PUBLICATIONS

Tamraparni Dasu, Shankar Krishnan, Suresh Venkatasubramanian and Ke Yi. "An Information-Theoretic Approach to Detecting Changes in Multi-Dimensional Data Streams." (2006).*

(Continued)

*Primary Examiner* — Jung H Park
*Assistant Examiner* — Hoyet H Andrews
(74) *Attorney, Agent, or Firm* — Schwegman Lundberg & Woesser, P.A.

(57) ABSTRACT

Examples of systems and methods for multisensory change detection are generally described herein. A method may include receiving a first set of signals from a first combination of sensors and a second set of signals from a second combination of sensors in a plurality of sensors, and determining a first distribution for the first set of signals and a second distribution for the second set of signals. The method may include estimating a divergence between the first and second distributions using the first and second combinations of sensors, a count of the plurality of sensors, and distances from a plurality of signals in the second set of signals to a first plurality of nearest neighbor signals in the first set of signals and a second plurality of nearest neighbor signals in the second set of signals. The method may include determining whether the divergence exceeds a threshold.

25 Claims, 6 Drawing Sheets

(51) Int. Cl.

| | | |
|---|---|---|
| *H04L 29/08* | (2006.01) | |
| *H04W 28/08* | (2009.01) | |
| *H04W 84/18* | (2009.01) | |

(56) References Cited

U.S. PATENT DOCUMENTS

| | | | | |
|---|---|---|---|---|
| 7,821,393 | B2* | 10/2010 | Ballester-Merelo | G01D 4/02 340/539.18 |
| 8,068,986 | B1* | 11/2011 | Shahbazi | H04L 63/126 342/28 |
| 9,226,124 | B2* | 12/2015 | Schuler | H04L 63/10 |
| 9,372,886 | B2* | 6/2016 | Feng | H04W 4/70 |
| 2006/0211415 | A1* | 9/2006 | Cassett | H04W 24/04 455/423 |
| 2006/0291657 | A1* | 12/2006 | Benson | G05B 13/0275 380/270 |
| 2007/0178844 | A1* | 8/2007 | Ii | G01S 5/0252 455/67.11 |
| 2008/0084295 | A1 | 4/2008 | Libby | |
| 2008/0234935 | A1 | 9/2008 | Wolf et al. | |
| 2011/0084924 | A1* | 4/2011 | Chang | G06F 3/0416 345/173 |
| 2011/0119523 | A1* | 5/2011 | Bisdikian | G06Q 10/04 714/2 |
| 2011/0155879 | A1 | 6/2011 | Bacchus | |
| 2011/0270553 | A1* | 11/2011 | Ausserlechner | G01R 15/202 702/64 |
| 2012/0086573 | A1* | 4/2012 | Bischoff | G06F 19/3418 340/573.1 |
| 2013/0201316 | A1* | 8/2013 | Binder | H04L 67/12 348/77 |
| 2013/0290305 | A1 | 10/2013 | Feng et al. | |
| 2014/0019084 | A1* | 1/2014 | Rolew | G01D 5/145 702/150 |
| 2014/0144233 | A1* | 5/2014 | Kim | G01P 15/08 73/504.12 |
| 2014/0247155 | A1* | 9/2014 | Proud | H04W 4/70 340/870.16 |
| 2014/0247156 | A1* | 9/2014 | Proud | H04W 4/70 340/870.16 |
| 2014/0249379 | A1* | 9/2014 | Proud | H04W 4/70 600/301 |

FOREIGN PATENT DOCUMENTS

| | | | | |
|---|---|---|---|---|
| CN | 104956715 | A | 9/2015 | |
| KR | 1020110125045 | A | 11/2011 | |
| KR | 1020110125047 | A | 11/2011 | |
| TW | 201309059 | A | 2/2013 | |
| TW | 20130155879 | A1 | 6/2013 | |
| TW | 201626340 | A | 7/2015 | |
| WO | WO-2012140601 | A1 | 10/2012 | |
| WO | WO2014/116977 | A2 * | 7/2014 | |
| WO | WO 2014116977 | A2 * | 7/2014 | G06F 21/55 |
| WO | WO-2014116977 | A2 | 7/2014 | |
| WO | WO-2016048788 | A1 | 3/2016 | |

OTHER PUBLICATIONS

M. Wälchli and T. Braun, "Event Classification and Filtering of False Alarms in Wireless Sensor Networks," 2008 IEEE International Symposium on Parallel and Distributed Processing with Applications, Sydney, NSW, 2008, pp. 757-764. doi: 10.1109/ISPA.2008.26.*

M. Wälchli and T. Braun, "Event Classification and Filtering of False Alarms in Wireless Sensor Networks," 2008 IEEE International Symposium on Parallel and Distributed Processing with Applications, Sydney, NSW, 2008, pp. 757-764. doi: 10.1109/ISPA.2008.26. (Year: 2008).*

Q. Wang, S. R. Kulkarni and S. Verdu, "A Nearest-Neighbor Approach to Estimating Divergence between Continuous Random Vectors," 2006 IEEE International Symposium on Information Theory, Seattle, WA, 2006, pp. 242-246, doi: 10.1109/ISIT.2006.261842.*

"An Introduction to the Internet of Things (IoT)", Lopez Research, [Online]. Retrieved from the Internet: <URL: http://www.cisco.com/c/dam/en_us/solutions/trends/iot/introduction_to_IoT_november.pdf>, (Nov. 2013), 6 pgs.

"International Application Serial No. PCT/US2015/050689, International Search Report dated Nov. 27, 2015", 3 pgs.

"International Application Serial No. PCT/US2015/050689, Written Opinion dated Nov. 27, 2015", 7 pgs.

"Taiwanese Application Serial No. 104127709, Office Action dated Jan. 25, 2017", w/English claims, 15 pgs.

Desobry, Frederic, et al., "An online kernel change detection algorithm", IEEE Transactions on Signal Processing, [Online]. Retrieved from the Internet: <URL: https://www.researchgate.net/publication/3319371_An_online_Kernel_change_detection_algorithm>, (Sep. 2005), 26 pgs.

Glazer, Assaf, et al., "Learning High-Density Regions for a Generalized Kolmogorov-Smirnov Test in High-Dimensional Data", NIPS, [Online]. Retrieved from the Internet: <URL: https://papers.nips.cc/paper/4553-learning-high-density-regions-for-a-generalized-kolmogorov-smirnov-test-in-high-dimensional-data.pdf>, (2002), 9 pgs.

Killourhy, Kevin S, et al., "Comparing Anomaly-Detection Algorithms for Keystroke Dynamics", Dependable Systems & Networks, IEEE. 978-1-4244-4421-2/09, (2009), 125-134.

"Taiwanese Application Serial No. 104127709, Office Action dated Jan. 8, 2018", w/o translation, 12 pgs.

"Taiwanese Application Serial No. 104127709, Response filed Jul. 31, 2017 to Office Action dated Jan. 25, 2017", w/ claims in English, 78 pgs.

"European Application Serial No. 15843960.4, Extended European Search Report dated May 3, 2018", 5 pgs.

"Taiwanese Application Serial No. 104127709, Response filed Apr. 3, 2018 to Office Action dated Jan. 8, 2018", w/ English claims, 55 pgs.

"Chinese Application Serial No. 201580045560.1, Office Action dated Mar. 5, 2019", w/ English Translation, 10 pgs.

* cited by examiner k=2

MULTISENSORY CHANGE DETECTION FOR INTERNET OF THINGS DOMAIN

CLAIM OF PRIORITY

This patent application claims the benefit of priority U.S. Provisional Patent Application Ser. No. 62/056,199, entitled "Multisensory Change Detection for Internet of Things Domain," filed on Sep. 26, 2014, which is hereby incorporated by reference herein in its entirety.

BACKGROUND

According to some technical analysts, there will be over 50 billion connected "things" by the year 2020. This will completely transform current infrastructures and will drive new innovations in industry, products, and services. One of the biggest challenges in rapid adoption of networked devices by enterprise and corporations is the complexity and knowledge required from various fields in order to bring Internet-of-Things (IoT) solutions to market. IoT is term that represents devices and systems that communicate over a network, such as the internet. The devices and systems may include sensors that create a large amount of data.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
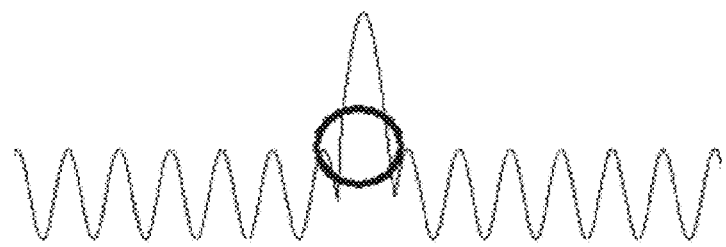
FIGS. 1A and 1B are graphs illustrating signal changes, according to an embodiment.

As discussed above, IoT networked devices will create challenges as the complexity and knowledge required to implement services may be high. A Cloud IoT Analytics Platform based on open source software may be designed to greatly minimize the complexities of ingesting and processing massive amounts of data generated in IoT scenarios. Another example computing platform may include a horizontal platform that offers different analytics services that may be applied to different vertical segments.

A Cloud IoT platform may include a system for collecting data from numerous devices and sensors and storing it in the cloud (e.g., scalable server system). This may enable a rule based engine, using complex machine learning techniques and advanced statistical process control in real time to provide alerts on process changes and anomalies.

A Cloud IoT platform may use change detection, which is a statistical method for detecting changes in system behavior. In an example, a method monitors sensor values describing a system. If the change in values of a plurality of sensors during a period of time is statistically significant, the method produces an alert. Previous solutions of change detection only allowed for single sensor monitoring.

The previous solutions utilize the approach of monitoring dissimilarities between current and past single sensor values, which are generally known as anomaly detection. Some anomaly detection techniques are based on statistical tests that assess the probability of observing a specific value, given previous reference values or a reference distribution. These techniques are limited, since they are designed to detect any brief changes, and do not consider the time-dimension in the statistical estimates. The anomaly detection techniques do not detect a change in data distribution or system behavior, instead they focus on a specific anomalous point. An example of such a test is computing the number of standard deviations from average of a new value, and assessing probability of the value, using a known reference distribution. Another example of anomaly detection is the one-class Support Vector Machines (SVM) technique.

Other techniques perform single-sensor change detection, using tests for comparing distributions, such as the Kolmogorov Smirnov test. The Kolmogorov Smirnov test compares a set of values of a sensor before the reference time point with a set of values of the sensor after the reference time point. The test builds one-dimensional distributions of each set of values and measures the distance between these two distributions. If the distance is above a certain threshold, an alert is raised indicating a threshold change in the sensor value distribution.

Single sensor change detection techniques are inherently limited because they deal with one-dimensional value distributions only, which do not take the full advantage of the "big data" essence of Internet of Things. These techniques cannot utilize the entire volume of information coming simultaneously from multiple sensors of a device due to their one-dimensional limitations. Therefore, single sensor change detection techniques have low and less than optimal detection rates for system changes and cannot trace correlation changes between sensors. An example of a single-sensor change detection technique includes the Kolmogorov Smirnov test.

Figure 1B:
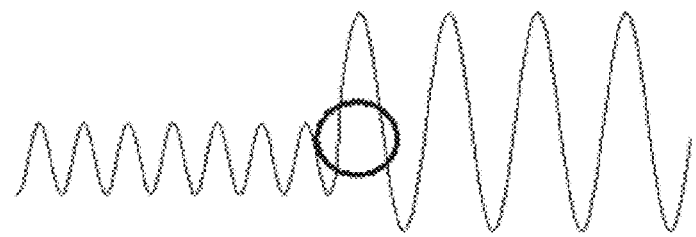

FIGS. 1A and 1B show graphs illustrating signal changes, according to an embodiment. In FIG. 1A, a graphical representation of combined signals over time is shown. In the middle of the graph, an anomaly (or brief change) occurs. An anomaly detection technique would be capable of detecting this anomaly. A change detection technique would also be capable of detecting this anomaly. In FIG. 1B, a shift in the combined signals is shown. An anomaly detection technique may not detect this type of change, which may become significant when considering its prolonged time period. A change detection technique would be able to detect this type of change. The change in FIG. 1B may represent a consistent change in system behavior, which may be detected by a change detection technique but not by an anomaly detection technique. In FIGS. 1A and 1B, the portions of the graphs before the changes may represent past distributions, the portions of the graphs during the changes (e.g., in the circle) may represent current distributions, and the portions of the graphs after the changes may represent future distributions.

In an example, multisensory change detection may include signal amplification from multiple sensors as an improvement over signals from a single sensor, and may obtain high statistical significance when considering many small changes together. Multisensory change detection may also include detecting a change in a sensor dependence pattern.

In an example, multisensory change detection may utilize the gathered sensory data in a way that single sensor change detection cannot. For example, a method may be used to raise alerts on process changes using information from several sensors simultaneously. This method may provide a better performance and show more process changes than single sensor change detection.

In an example, a combination of sensors may be used for change detection tests in the domain of Internet of Things, forming multisensory change detection tests. The Internet of Things domain may be characterized as a continuous flow of information coming from various sensors of multiple devices simultaneously, therefore the multisensory processing and change detection useful.

Multisensory change detection also may compute whether a multisensory change has occurred. In each point in time a score may be computed that measures the dissimilarity of the past and future values of the sensors in this combination. If the dissimilarity is above a threshold the alert may be raised. In an example, a multisensory change detection technique is specifically adapted to the Internet of Things domain because it is accurate and efficient in view of the size of data required and may be implemented in online streaming mode which may be useful in the Internet of Things domain.

The approach and the technique may be used beyond Internet of Things domain, for example in robotics for autonomous environment control and in security for upcoming attack detection.

As discussed above, existing change detection techniques use only one sensor at a time, and therefore are limited in their capabilities. To detect the change in the sensor values in the reference point of time, these techniques apply a running window of a fixed length around the reference time and perform a number of statistical tests on the sensor values in this time window. Specifically, the time window may be divided into two disjoint subwindows, and the Kolmogorov Smirnov test may be applied to measure differences between sensor value distributions in these subwindows. The change is detected if at least one pair of subwindows is found to have different distributions of values according to the Kolmogorov Smirnov test. The two-way Kolmogorov Smirnov test provides the probability of having the observed distance between the empirical distributions of the two subwindows, if they originate from the same theoretical distribution. If the distribution is below a threshold, an alert may be raised.

In an example, the multisensory change detection technique is better than the existing single sensor change detection techniques because multisensory change detection produces higher sensitivity to changes by gathering signals from a number of sensors simultaneously. Multisensory change detection may also be able to measure differences in the correlation between groups of sensors whereas single sensory change detection cannot.

To measure the benefits of multisensory change detection in comparison with single sensor change detection, a number of benchmarks may include:
  A specified security application of Internet of Things (keystroke based authentication);
  Directly comparing multisensory and single sensory change detection among different simulated data sets, with known changes in distribution;
  Comparisons may be based on measuring detection rate while maintaining same false rate (for example, up to 8 times better detection in multisensory change detection when the false rate is held constant);
  Comparisons may measure detection of sensory correlation changes, which could not be possible to detected using single sensor change detection (e.g., up to a 35% detection rate).

Multisensory change detection may be classified in the domain of multivariate change detection. Existing anomaly detection techniques are based on employing One Class Support Vector Machines (SVM) for multivariate probability distribution estimation.

One drawback of single sensor change detection techniques with regard to the Internet of Things domain is the need to perform One Class SVM model learning as a condition for the change detection. The SVM model learning is a computationally extensive method since it involves solving a quadratic optimization problem. Also, the SVM model requires a large number of data points for the model training, that may be an order of magnitude bigger than a number of sensors in a device. With the point of view of Internet of Things, this means that the anomaly detection techniques pose significant computational load on the cloud system and do not allow fast online detection due to the large number of time points required for training.

The multisensory change detection technique score computation may be fast and straightforward for involved optimization techniques. In addition, the number of points in a time window for robust score computation may be much lower for multisensory change detection than anomaly detection or single sensor change detection, and an inherent delay of the multisensory change detection alerting may be very small. In an example, a multisensory change detection technique is able to produce fast online predictions without high computational load on the cloud system, which is an advantage for the Internet of Things domain.

Figure 2:
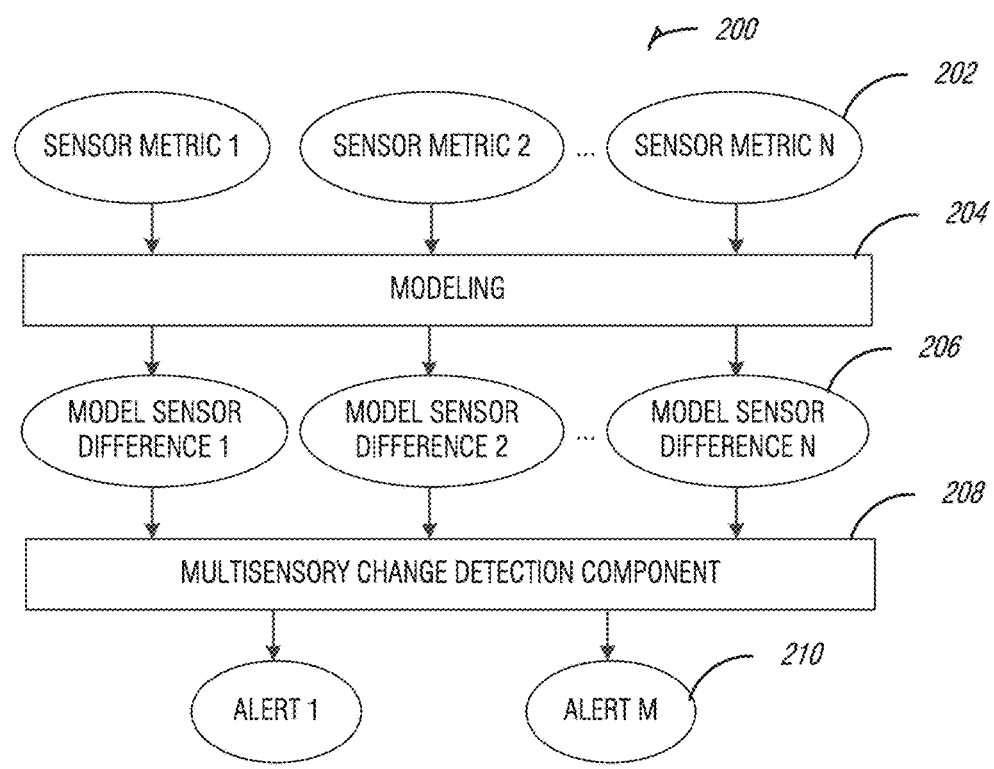
FIG. 2 is a block diagram illustrating a system for multisensory change detection, according to an embodiment.

FIG. 2 shows a block diagram illustrating a system 200 for multisensory change detection, according to an embodiment. In an example, a multisensory change detection component (MCDC) 208 will generate automatic online alerts, such as Alert M 210 on anomalous changes in device sensors data, based on values of predefined combinations of sensors. A combination of sensors may be selected by a user or automatically determined. A sensor N may output a sensor metric N 202, which may be compared by modeling 204. The modeling 204 may output a model sensor difference N 206 for sensor metric N 202. The model sensor difference N 206 may be combined with one or more other model sensor differences in the multisensory change detection component 208. The multisensory change detection component 208 may output one or more alerts, such as alert M 210 related to changes detected.

In an example, a device may be a physical object containing, or connected to one or more sensors. The sensor may be a part of the device or external objects that use the device as a hub. A metric may represent a series of values obtained from a single sensor. For example, metrics may include temperature, humidity, wind, speed, geographic coordinates, sound, etc. In an example, data may be normalized. Normalization constants may be calibrated for each sensor in the modeling stage or for a combination of sensors. For example, multiplicative factor constants $k_i$ and additive factor constants $b_i$ may relate to each input $v_i$ so that a normalization equation may include $v_i'=k_i*v_i+b_i$. This equation is an exemplary embodiment and other techniques for normalization may be used.

In an example, sensor metric values may be aggregated to the same time interval, e.g., minute sampling. In an example, a number of samples in the time window may be an order of magnitude of the number of sensors in the combination, for example, to create time window sizes.

Figure 3:
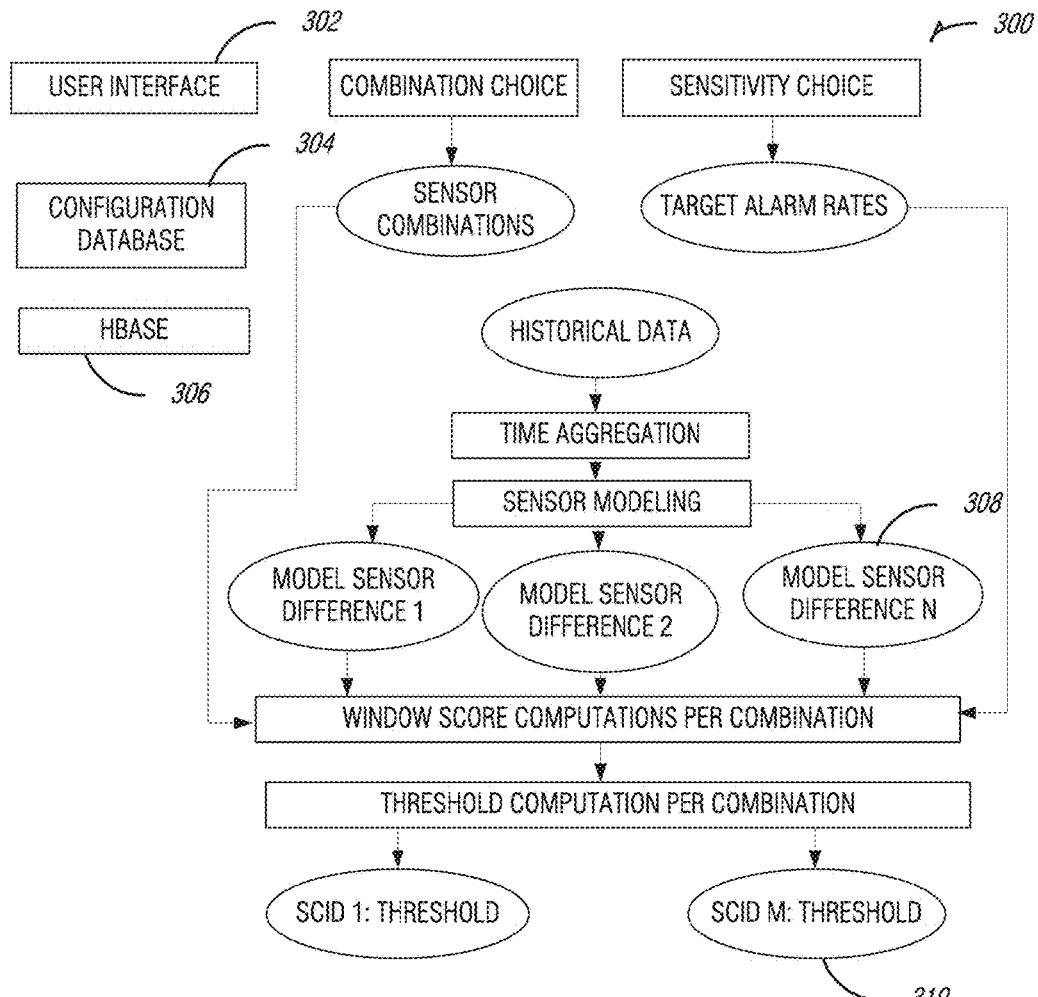
FIG. 3 is a block diagram illustrating a system for sensor threshold combination computation, according to an embodiment.

FIG. 3 shows a block diagram illustrating a system 300 for sensor threshold combination computation, according to an embodiment. Multisensory change detection may include a training stage. The training stage may include determining a threshold, and the threshold may be determined recursively. In an example, the training stage may be implemented as a separate operational stage. A system 300 may include a user interface 302 that may allow a user to select a combination of sensors or a sensitivity for target alarm rates, or the combination of sensors or sensitivity may be selected automatically (e.g., all sensors on a particular device may be included in the combination). To train the multisensory change detection technique, a training combination may consist of a subset of sensors of a device or a subset of the sensor combinations selected by the user or automatically. A sensor may be a part of several sensor combinations.

The system 300 may include a configuration database 304 to store the sensor combinations and target alarm rates. In an example, the system 300 may include a HBase 306 to store historical data. The system 300 may retrieve historical data from a specified time and model sensor differences, such as a model sensor difference N 308. The sensor combinations, target alarm rates, and model sensor differences may be used by the system 300 to determine a window score computation for one or more combinations of model sensor differences. The system 300 may then use the window score computations for the one or more combinations to determine a threshold for the one or more combinations. For example, model sensor difference N 308 may be combined with one or more other model sensor differences to create a sensor combination (with an identification M, or SCID M) to ultimately create a threshold 310 for SCID M. The threshold 310 may then be compared to a detected multisensor change to determine whether to issue an alert. If a detected multisensor change for a sensor combination exceeds the threshold for the combination, an alert may be issued.

A training period for each combination to be trained may be selected by a user or automatically. A target false alarm rate f for each combination to be trained may also be chosen, by a user or automatically. The target alarm rate may include preset configurations of overall device alarm rate, such as high, medium, or low. Target false alarm rates for all combinations may be equal. Target false alarm rates may also be defined automatically, such as so that there is no more than one false alarm per day, week, or month. Other recursive methods for determining a target false alarm rate may be used, such as selecting a ratio of false alarm rates to changes detected, a ratio of false alarm rates to correct alarm rates, or the like. In another example, a user may choose a time period for false alarm rates so that a device outputs one false alarm on average over the time period. The target false alarm rate may also be selected by using a target correct alarm rate (e.g., no false negatives, which may equate to a high false alarm rate).

In an example, estimations may be similar to estimation of differential entropy, such as in the following equation:

$$H(X) = -\int g(x) \log g(x) dx$$

Estimations may also include histograms or a Parzen-windows estimation, such as in the following equation:

$$H = -\frac{1}{N} \sum_i \log \left\{ \frac{1}{N} \sum_j \phi(x_i - x_j) \right\}$$

Drawbacks to these estimation techniques include difficulty in choosing a kernel $\varphi$, or processing challenges with high dimensionality.

KNN estimation of differential entropy may include:
$x_1, \ldots, x_N$: samples;
$\varepsilon_{ik}$—distance from $x_i$ to its k-th nearest neighbor;
Local estimations of probability density, such as:

$$g(x) \sim \frac{k}{\varepsilon^d}$$

$$H = -E \log g(x) \sim -\frac{1}{N} \sum_{i=1}^{N} \log g(xi) \text{ with } \lim_{N \to \infty} Hk = H$$

Figure 4:
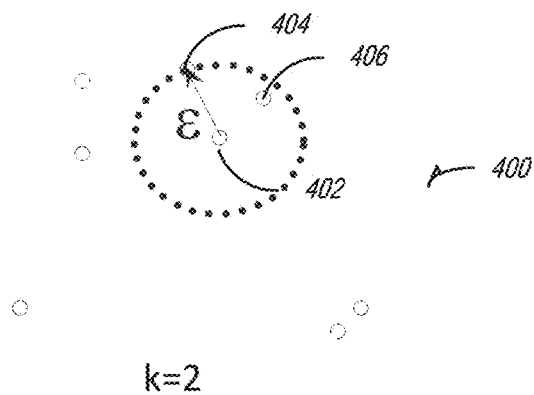
FIG. 4 is a graph illustrating k-nearest neighbors estimation, according to an embodiment.

FIG. 4 shows a graph 400 illustrating k-nearest neighbors estimation, according to an embodiment. In the example graph 400 shown in FIG. 4, k is set to equal 2, and the distance from sample 402 to sample 404 and sample 406 are computed, as samples 404 and 406 are the two-nearest neighbors to sample 402 as shown by graph 400. Additional sample distances from sample 402 would be computed if the k value was increased. If the k value was decreased to 1, only the distance from sample 402 to sample 406 would be computed.

An estimation method, such as the k-nearest neighbors (KNN) estimation of differential entropy may be modified to be used to estimate Kullback Leibler (KL) divergence. In an example, multisensory change detection may include a sliding window score computation of an alarm threshold (T). As discussed above, each trained sensor combination may be trained separately. Training data for a specified period may be organized in a time-ordered manner. Training data may also be normalized, such as according to sensor normalization constants as discussed above. A sliding window may be applied to the data, and each time point may be chosen to be a reference. Each window may include n (parameter) sensor combinations values immediately before the reference point and m (parameter) sensor combinations values immediately after the reference point. For each sliding window a k-nearest neighbors (KNN) estimation of a Kullback Leibler (KL) (KNN KL) divergence score may be computed. For example, an equation may be used where d represents the number of sensors in the combination. For each point in the set of sensor combinations in the Past (ρ) set, the KNN KL divergence estimation may determine distances to k (parameter) nearest neighbors in the Past (ρ) set and in the set of sensor combinations in the Future (ν) set. The KNN KL estimator equation may include determining P, the divergence for the Past (ρ) set:

$$P == \frac{d}{n}\sum_{i=1}^{n} \log\frac{v_m(i)}{\rho_n(i)} + \log\frac{m}{n-1}.$$

KL divergence may include representing a distance between distributions. In an example, KL divergence may include an expected (or calculated) number of extra bits required to code samples from a first distribution when using a code based on a second distribution, rather than using a code based on the first distribution. KL divergence also may not be symmetrical with respect to distributions, such as returning different results when calculated using signals from a first distribution coded to a second distribution and signals from the second distribution coded to the first distribution. KNN estimation of KL divergence may avoid multidimensional distribution estimation.

In another example, the multisensory change detection technique may include repeating the equation for each point in Future (v) set and return score F. The total divergence score may be estimated using score values P plus F for a given window.

When training, after computation of scores is finished for the entire train set, a threshold for score values may automatically be detected to meet a target false alarm rate. Values of score estimations computed (such as P and F) may be sorted in descending order, where S(1) is the largest score, and S(w) is the smallest score, where w is a number of scores computed at the training stage. A cutting index t may be computed by multiplying the target false alarm rate by the number of scores computed at the training stage, such as t=f*w. A threshold may include the KNN KL divergence score estimation for a particular reference point at the cutting index, such as T=S(x). For example, if there are four scores computed at the training stage, and the target false alarm rate is 50%, the cutting index will be 0.5*4=2. Then, in the example, the threshold will be the KNN KL divergence score estimation for S(2), (e.g., the second largest score in the descending order sort). The threshold may be stored in a database for future use.

Figure 5:
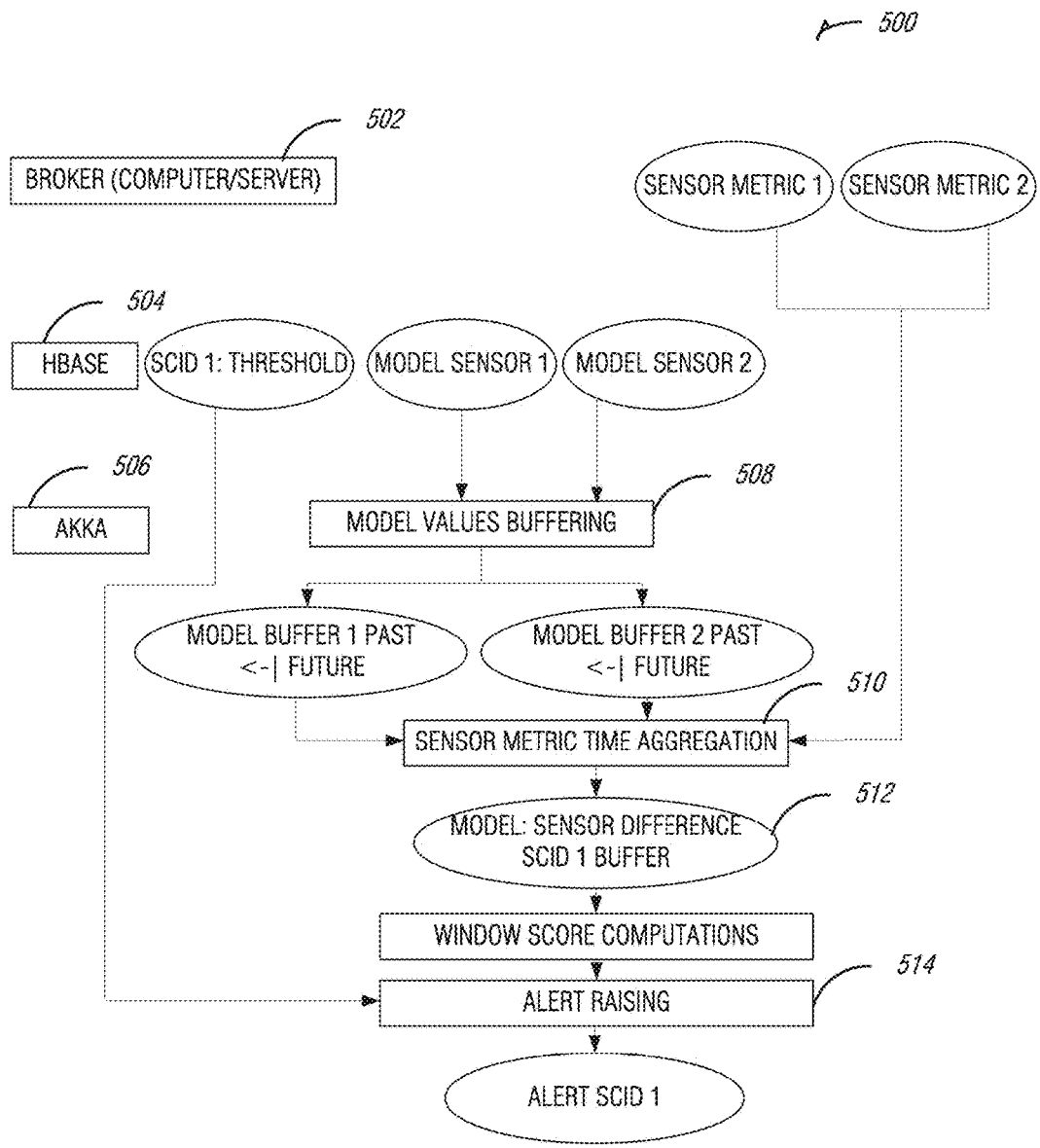
FIG. 5 is a block diagram illustrating a system for sensor value buffering, according to an embodiment.

FIG. 5 shows a block diagram illustrating a system 500 for sensor value buffering, according to an embodiment. The system 500 may include a broker 502, such as a computer or server, to receive sensor metrics. The system 500 may also include a historical database (HBase) 504 to store sensor combination thresholds or model sensor information. Other databases or distributed applications may be included in the system 500. Model sensor information may be used by the system 500 to buffer model values 508. In an example, sensor data may be added to a buffer, wherein the buffer includes current sensor data and immediate past sensor data. In another example, the buffer system may include pushing immediate past sensor data to another buffer segment when current sensor data is received, and storing current sensor data in one buffer and immediate past sensor data in a second buffer. In another example, each sensor may have an associated separate buffer or buffers for storing sensor data. In system 500, the buffered model sensor information and the sensor metrics from the broker 502 may be used to aggregate sensor metric time 510. The sensor metric time aggregation 510 may be used to model sensor difference and buffer a sensor combination identification (SCID) value 512. The system 500 may compute a window score from the model sensor difference and the SCID buffer. In an example, the window score computation may be compared to a SCID threshold to determine if the window score exceeds the SCID threshold, and if it does, raise an alert 514. The alert raising 514 may include an SCID alert In an example, after the training stage, the multisensory change detection may include a test stage (or main stage). The data may be resampled according to the unit sample time and may be stored online and aggregated. Each trained combination may be processed and saved separately. In an example, a window of (n+m) previous samples may be maintained for each combination. Other sample sizes may be maintained as well. Stored data may be normalized and used for other similar devices with the same or similar combinations of sensors. In multisensory change detection, after an update of a window the KNN KL score may be computed. If the score is above a trained threshold, an alert may be raised for the specified combination of sensors related to the threshold and the score. The alert may be local or remote, audible, visual, or sent to a user, such as by email, text message, phone call, email, or the like.

In another example, the multisensory change detection flow may include detecting changes with respect to fixed points in the past or to the immediately prior point. The multisensory change detection relative to a reference point may include storing a snapshot of the past system in the form of L (parameter) months, weeks, days, hours, minutes, seconds or the like. A score threshold (D) may be calibrated for a given size of a future window as well. A future window point may be captured at a later time and a Score Z may be calculated using the multisensory change detection technique described above. If Z>D an alert may be raised.

In an example, using more than one sensor may include benefits such as a higher detection rate (e.g., up to 8 times) for same false alarm rate compared to single sensor methods. Using more than one sensor may also include a benefit of sensitivity to a sensor correlation change (e.g., 35% detection rate). Single-sensor methods are not sensitive to sensory correlation change.

Figure 6:
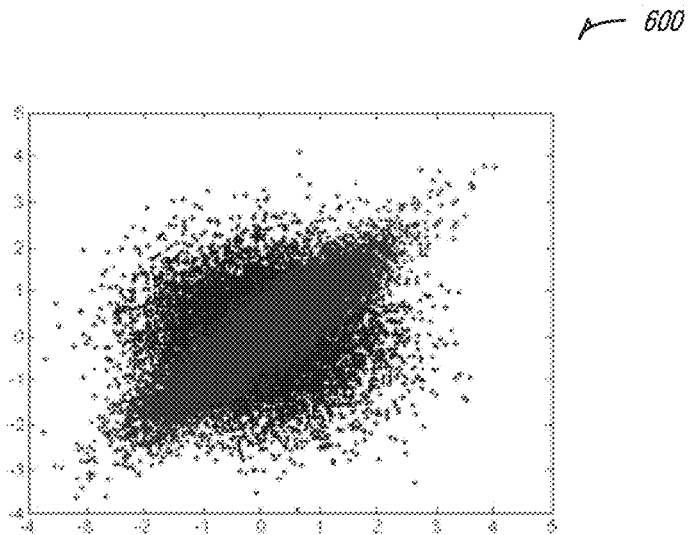
FIG. 6 is a graph illustrating signal distributions, according to an embodiment.

FIG. 6 shows a graph 600 illustrating signal distributions, according to an embodiment. A multisensory change detection technique may correctly identify differences between distributions in the graph 600, such as the elliptical distribution and the circular distribution shown. Techniques reliant on one sensor fail to correctly identify differences between distributions in the graph 600.

Multisensory change detection methods, single sensory change detection methods, and anomaly detection methods may discover short-period bursts of unusual data segments arriving from a device, however only multisensory change detection may provide data of the whole device behavior change. After a change is discovered by the multisensory change detection technique, the device may be recalibrated to continue its monitoring. An alert from a multisensory change detection technique is not limited to a negative alert, but may also include alerting improved device or system behavior, or a change not classified as improved or negative. Multisensory change detection may achieve detection capabilities that may bring highly valuable information to a user, which are not found in anomaly detection or in single sensory change detection.

In an example, experimental results may include those in Tables 1 and 2. Table 1 compares KNN KL to the Kolmogorov Smirnov test, showing the KNN KL results as superior to the KS results.

TABLE 1

Experimental results comparing KNN KL to KS

| Test | Window | FA tuned | Actual FA | Detection Rate |
|---|---|---|---|---|
| KL, detect µ = µ + 1 | 50, 10 (k = 8) | 0.001 | 0.0009 | 0.139 |
| KS, detect µ = µ + 1 | 50, 10 | 0.001 | 0.0004 | 0.131 |
| KL, detect µ = µ + 2 | 50, 10 (k = 8) | 0.001 | 0.0006 | 0.921 |
| KS, detect µ = µ + 2 | 50, 10 | 0.001 | 0.0004 | 0.871 |
| KL, detect µ = µ + 1 | 30, 10 (k = 5) | 0.01 | 0.013 | 0.31 |
| KS, detect µ = µ + 1 | 30, 10 | 0.01 | 0.005 | 0.326 |
| KL, detect µ = µ + 1 | 30, 10 (k = 8) | 0.01 | 0.006 | 0.343 |
| KL, detect µ = µ + 2 | 30, 10 | 0.01 | 0.008 | 0.96 |
| KS, detect µ = µ + 2 | 30, 10 (k = 8) | 0.01 | 0.006 | 0.94 |
| KL, detect σ = σ + 1 | 30, 10 (k = 8) | 0.01 | 0.012 | 0.063 |
| KS, detect σ = σ + 1 | 30, 10 | 0.01 | 0.007 | 0.015 |
| KL, detect σ = σ + 2 | 30, 10 (k = 8) | 0.01 | 0.011 | 0.132 |
| KS, detect σ = σ + 2 | 30, 10 | 0.01 | 0.004 | 0.025 |
| KL, detect σ = σ + 3 | 30, 10 (k = 8) | 0.01 | 0.009 | 0.264 |
| KS, detect σ = σ + 3 | 30, 10 | 0.01 | 0.006 | 0.036 |

KNN KL estimation may leverage multidimensional information to detect changes, that cannot be detected by one-dimensional methods, such as small changes in µ, small changes in Σ, or changes in the correlation ρ. Baseline data may use the normal distribution with µ=0 and σ=1. Results of these detection rates are shown in Table 2.

TABLE 2

Experimental results for different values of standard deviation, mean, and correlation.

| Test | Window | FA tuned | Actual FA | Detection Rate |
|---|---|---|---|---|
| KL, 20D, Σ = Σ + I(20) | 30, 10 (k = 8) | 0.01 | 0.010 | 0.560 |
| KL, 2D, Σ = Σ + I(2) | 30, 10 (k = 8) | 0.01 | 0.007 | 0.067 |
| KL, 20D, $\vec{\mu} = \vec{\mu} + 1$ | 30, 10 (k = 8) | 0.01 | 0.010 | 1.000 |
| KL, 2D, $\vec{\mu} = \vec{\mu} + 1$ | 30, 10 (k = 8) | 0.01 | 0.007 | 0.638 |
| KL, 2D, ρ = ρ + 0.9 | 30, 10 (k = 8) | 0.01 | 0.02 | 0.35 |

In an example, KNN KL Multisensory Change Detection may be performed on real data, and experimental results are shown in table 3. For example, keystrokes may be used for data, such as a real world finger typing timings data set. Real world data of finger typing timings may include:

Same 10-letter password repetitively typed 51 human subjects 8 daily sessions per each human 50 repetitions in each daily session Each typing characterized by 20 timings of key up-key pressed Overall each human may be represented by 400 samples*20 sensors In an example, application of keystrokes data to multisensory change detection may include:

1. Use session of consecutive 20× timings of a human as a start

2. Stick session of consecutive 20× timings of another human

3. Detecting the stick point

4. Detecting false alarms

5. Repeating the technique to develop a sample set.

TABLE 3

Experimental results using real data

| Method | Window Size | Change Detection Rate | Actual False Alarm Rate (tuned for FA 0.01) | K Statistics |
|---|---|---|---|---|
| KNN KL Divergence, 20D | 10 | 0.974 ± 0.056 | 0.029 ± 0.064 | 2 |
| KNN KL Divergence, 20D | 4 | 0.761 ± 0.175 | 0.019 ± 0.020 | 2 |
| KNN KL Divergence, 20D | 10 | 0.704 ± 0.184 | 0.019 ± 0.032 | 2 |
| KNN KL Divergence, 20D | 4 | 0.489 ± 0.077 | 0.016 ± 0.021 | 2 |

The above tables of experimental results are from exemplary embodiments. Other results may occur using other embodiments described in this disclosure.

Figure 7:
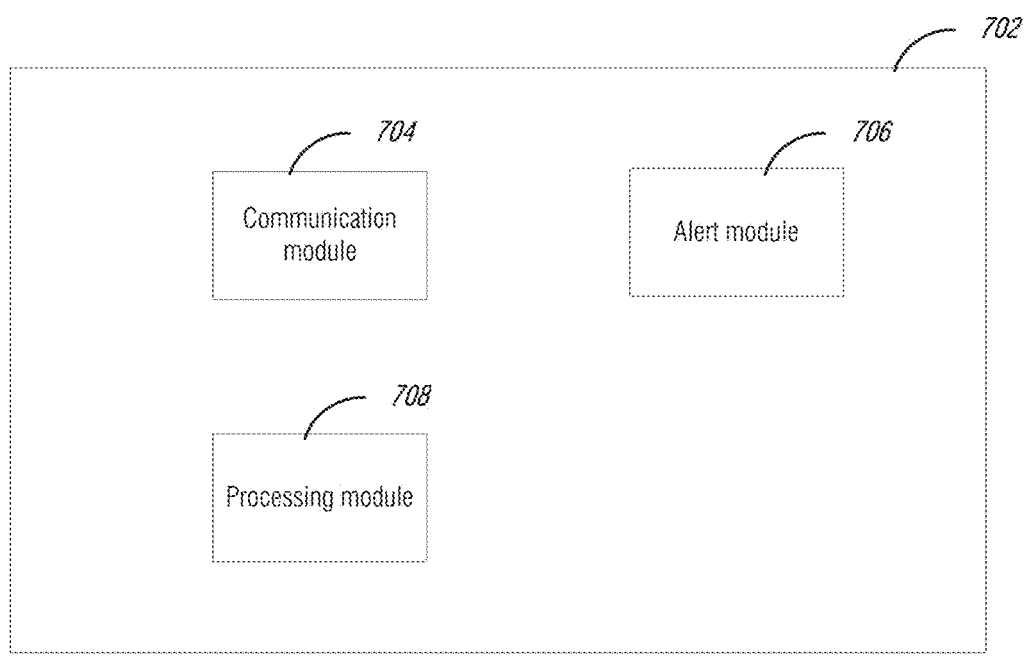
FIG. 7 is a schematic drawing illustrating a multisensory change detection system, according to an embodiment.

FIG. 7 shows a schematic drawing illustrating a multisensory change detection system 702, according to an embodiment. In an example, a multisensory change detection system 702 may include a communication module 704. The communication module 704 may receive signals, such as a signal from a sensor. The communication module 704 may receive a first set of signals from a first combination of sensors in a plurality of sensors and may receive a second set of signals from a second combination of sensors in the plurality of sensors. In an example, the communication module 704 may receive another set of signals from each of the first and second combinations of sensors. In another example, the communication module 704 may receive information or characteristic data about sensor states or environmental states.

The multisensory change detection system 702 may include a processing module 708. The processing module 708 may determine a first distribution for a the first set of signals and a second distribution for the second set of signals, the first and second sets of signals received by the communication module. In an example, the processing module 708 may estimate a divergence between the first distribution and the second distribution. For example, the processing module 708 may estimate the divergence using a count of the first and second combinations of sensors, a count of the plurality of sensors, and distances from a plurality of signals in the second set of signals to a first plurality of nearest neighbor signals in the first set of signals and a second plurality of nearest neighbor signals in the second set of signals. The distance estimation of nearest neighbor signals may use a k-nearest neighbor estimation of the KL distance between a signal in the second set of signals and both a signal in the first and second set of signals. The k in the k-nearest neighbors may include the plurality of nearest neighbor signals. The processing module 708 may also determine whether the divergence exceeds a threshold. When the divergence exceeds the threshold, the processing module 708 may generate an alert.

The processing module 708 may estimate the divergence by estimating a number of additional bits required to code the first set of signals using a code based on the second distribution. For example, the estimated number of bits required to code the first set of signals using a code based on the first distribution may be a specified number of bits, and coding the first set of signals using the second distribution code may require additional bits beyond the number of bits. In another example, the processing module 708 may determine the threshold using a target false alarm rate. In an example, the multisensory change detection system 702 may include an alert module 706. The alert module 706 may play sound, vibrate, flash an alert, or otherwise indicate to a user that an alert has been generated.

Figure 8:
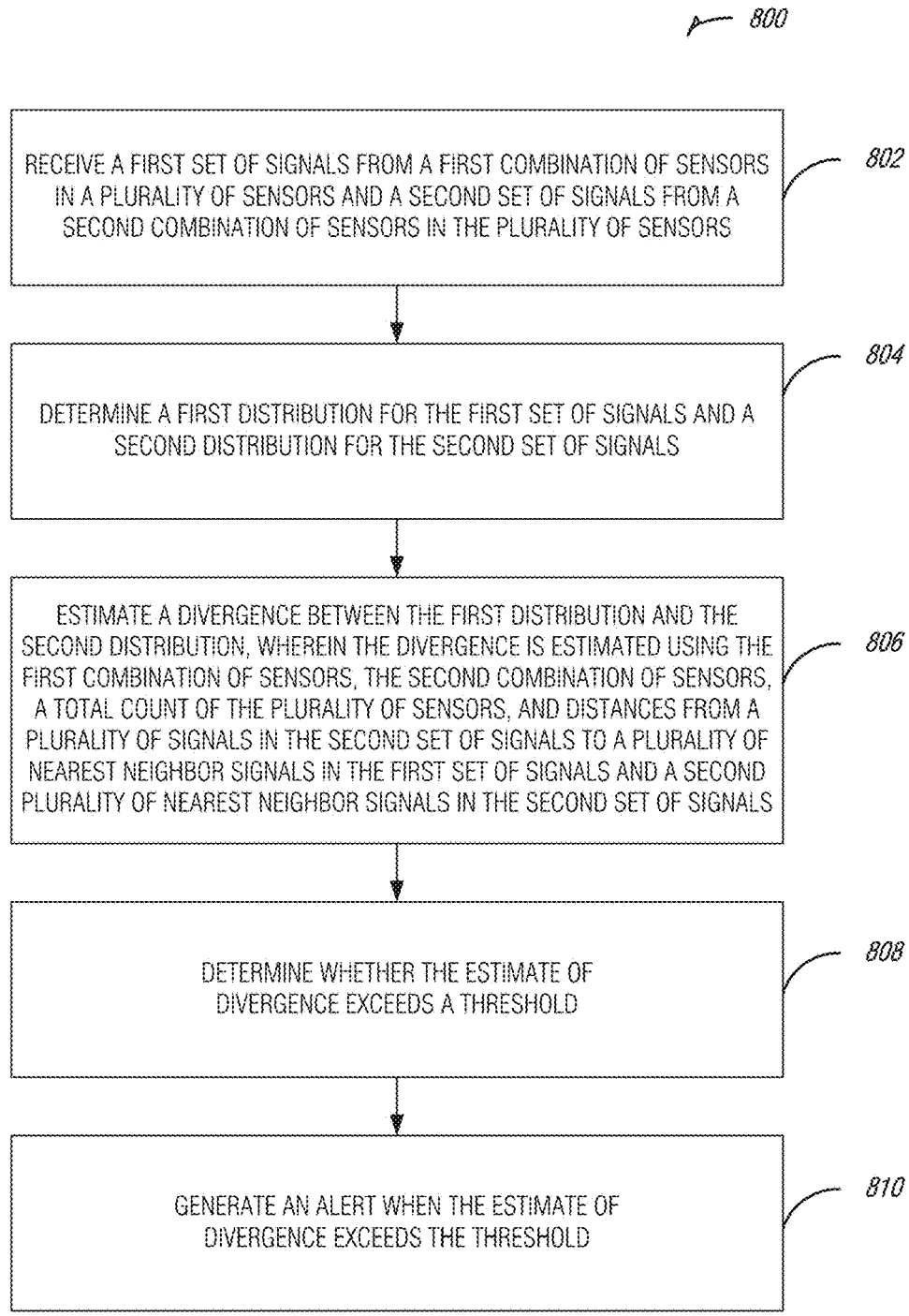
FIG. 8 is a flowchart illustrating a method for multisensory change detection, according to an embodiment.

FIG. 8 shows a flowchart illustrating a method 800 for multisensory change detection, according to an embodiment. In an example, the method 800 may include an operation 802 to receive a first set of signals from a first combination of sensors in a plurality of sensors and a second set of signals from a second set of signals from a second combination of sensors in the plurality of sensor. Operation 804 of the method 800 may include determine a first distribution for the first set of signals and a second distribution for the second set of signals. The method 800 may include operation 806 to estimate a divergence between the first distribution and the second distribution, wherein the divergence is estimated using the first combination of sensors, the second combination of sensors, a total count of the plurality of sensors, and distances from a plurality of signals in the second set of signals to a plurality of nearest neighbor signals in the first set of signals and a second plurality of nearest neighbor signals in the second set of signals. In an example, the method 800 may include an operation 808 to determine whether the estimate of divergence exceeds a threshold and an operation 810 to generate an alert when the estimate of divergence exceeds the threshold.

In another example, a method may include operations including receiving characteristic data from a plurality of sensors at a first period and a second period, the characteristic data representing a sensor state or an environmental state. In an example, the sensor state may include a location of the sensor, an angle or orientation of the sensor, acceleration of the sensor, movement of the sensor, operational status, or the like. In another example, the environmental state may include information such as wind speed, temperature, heat index, humidity, acceleration, movement, luminosity, signal strength, audio, video, chemical analyses, external device functionality, or the like. Characteristic data may include one or more of any of these examples or the like. The first period may include a point in time immediately preceding the second period. The first period may also include a point in time remotely preceding the second period. The first period and second period may include a moment in time or a window in time, discrete or continuous, and may be of the same length window, substantially the same length window, or a different length window of time. The plurality of sensors may include a combination of sensors selected automatically or by a user. In another example, the plurality of sensors may be a complete group of sensors for a particular device or particular devices. The plurality of sensors may include any type of measurement apparatus, passive or active.

In an example, operations may include analyzing the characteristic data at the first period and the second period to calculate an estimate of divergence of the sensor state or the environmental state of the plurality of sensors from the first period to the second period. In an example, to calculate an estimate of divergence in any of the above methods may include using a k-nearest neighbors (KNN) estimation of a Kullback Leibler (KL) (KNN KL) divergence score. For example, for each point in the plurality of sensors in the first period, calculating estimate of divergence may include determining distances to k-nearest neighbors in the first period and in the second period. Calculating the estimate of divergence may also include determining distances to k-nearest neighbors in the first period and in the second period for each point in the plurality of sensors in the second period. Calculating the estimate of divergence may include combining both sets of determined distances. In an example, one of the first period or the second period may have occurred before the other.

Operations may include determining whether the estimate of divergence exceeds a threshold, and generating an alert when the estimate of divergence exceeds the threshold. The threshold may include an estimate of divergence for a particular reference period to another particular reference point, such as using periods before the first period and the second period. The threshold may include a predetermined value, such as a value that minimizes a false error rate while also minimizing a false negative rate. In another example, the threshold may include a predetermined value, such as a user selected value. The threshold may include an estimate of a KNN KL divergence score, determined prior to analyzing the characteristic data. The threshold may be stored and the method may access the threshold to determine whether the estimate of divergence exceeds the threshold.

The alert may include an alert local to a device determining whether the estimate of divergence exceeds the threshold or remote to the device. Generating the alert may include generating a change in a user interface to display the alert, such as an audible or visual alert. The alert may be sent to a user, such as by email, text message, phone call, email, or the like. The alert may include a vibrational component.

Figure 9:
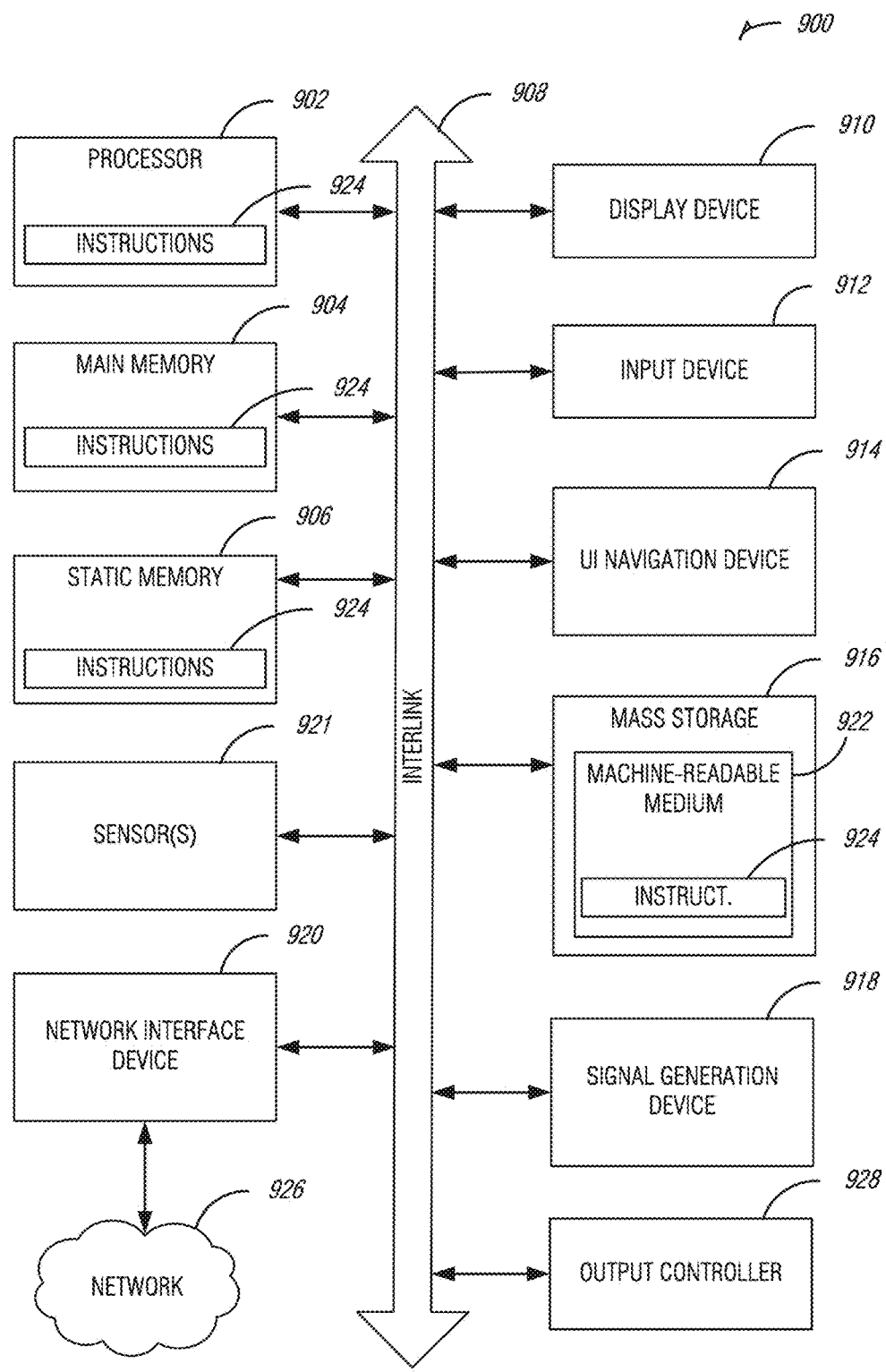
FIG. 9 is a block diagram illustrating an example machine upon which any one or more of the techniques (e.g., methodologies) discussed herein may perform, according to an embodiment.

FIG. 9 shows a block diagram illustrating an example machine 900 upon which any one or more of the techniques (e.g., methodologies) discussed herein may perform, according to an embodiments. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, alphanumeric input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 that is non-transitory on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

Additional Notes & Examples

Each of these non-limiting examples can stand on its own, or can be combined in various permutations or combinations with one or more of the other examples.

Example 1 includes the subject matter embodied by a multisensory change detection system comprising: a communication module to receive a first set of signals from a first combination of sensors in a plurality of sensors and receive a second set of signals from a second combination of sensors in the plurality of sensors, and a processing module to: determine a first distribution for the first set of signals and a second distribution for the second set of signals, estimate a divergence between the first distribution and the second distribution, wherein the divergence is estimated using a count of the first combination of sensors, a count of the second combination of sensors, a count of the plurality of sensors, distances from a plurality of signals in the second set of signals to a first plurality of nearest neighbor signals in the first set of signals and distances from a plurality of signals in the second set of signals to a second plurality of nearest neighbor signals in the second set of signals, and determine whether the divergence exceeds a threshold.

In Example 2, the subject matter of Example 1 may optionally include wherein the processing module is further to: detect that the divergence exceeds the threshold, and in response to detecting that the divergence exceeds the threshold, generate an alert.

In Example 3, the subject matter of one or any combination of Examples 1-2 may optionally include wherein the first plurality of nearest neighbor signals and the second plurality of nearest neighbor signals include fewer signals than the first set of signals and the second set of signals respectively.

In Example 4, the subject matter of one or any combination of Examples 1-3 may optionally include wherein the divergence is estimated using distances from a plurality of signals in the first set of signals to a third plurality of nearest neighbor signals in the first set of signals and a fourth plurality of nearest neighbor signals in the second set of signals.

In Example 5, the subject matter of one or any combination of Examples 1-4 may optionally include wherein the first combination of sensors and the second combination of sensors are the same.

In Example 6, the subject matter of one or any combination of Examples 1-5 may optionally include wherein the second set of signals are received immediately preceding the first set of signals.

In Example 7, the subject matter of one or any combination of Examples 1-6 may optionally include wherein to estimate the divergence, the processing module is further to estimate a number of additional bits required to code the first set of signals using a code based on the second distribution.

In Example 8, the subject matter of one or any combination of Examples 1-7 may optionally include wherein the processing module is further to determine the threshold using a target false alarm rate.

In Example 9, the subject matter of one or any combination of Examples 1-8 may optionally include wherein the processing module is to determine the target false alarm rate recursively using a ratio of false alarm rates to correct alarm rates.

In Example 10, the subject matter of one or any combination of Examples 1-9 may optionally include wherein the second combination of sensors is selected by a user.

In Example 11, the subject matter of one or any combination of Examples 1-10 may optionally include wherein the communication module is further to receive characteristic data from a third combination of sensors at a first period and a second period, the characteristic data representing sensor states, wherein the processing module is further to analyze the first and second periods to determine a difference between the sensor states of the third combination of sensors at the first period and the second period, and wherein the processing module is to use the determined difference to estimate the divergence.

In Example 12, the subject matter of one or any combination of Examples 1-11 may optionally include wherein the sensor states includes at least one of a sensor location, a sensor angle, a sensor orientation, a sensor movement, or a sensor operational status.

In Example 13, the subject matter of one or any combination of Examples 1-12 may optionally include wherein the communication module is further to receive characteristic data from the plurality of sensors at a first period and a second period, the characteristic data representing environmental states, wherein the processing module is further to analyze the first and second periods to determine a difference between the environmental states of the plurality of sensors at the first period and the second period, and wherein the processing module is to use the determined difference to estimate the divergence.

In Example 14, the subject matter of one or any combination of Examples 1-13 may optionally include wherein the environmental states includes information about at least one of wind speed, temperature, heat index, humidity, movement, luminosity, signal strength, audio, video, chemical composition, or external device functionality.

In Example 15, the subject matter of one or any combination of Examples 1-14 may optionally include wherein the first combination of sensors is selected by a user.

Example 16 includes the subject matter embodied by a method for multisensory change detection comprising: receiving, at a device, a first set of signals from a first combination of sensors in a plurality of sensors, receiving, at the device, a second set of signals from a second combination of sensors in the plurality of sensors, determining, at the device, a first distribution for the first set of signals, determining, at the device, a second distribution for the second set of signals, estimating, at the device, a divergence between the first distribution and the second distribution, wherein the divergence is estimated using the first combination of sensors, the second combination of sensors, a total count of the plurality of sensors, distances from a plurality of signals in the second set of signals to a first plurality of nearest neighbor signals in the first set of signals, and distances from a plurality of signals in the second set of signals to a second plurality of nearest neighbor signals in the second set of signals, and determining, at the device, whether the divergence exceeds a threshold.

In Example 17, the subject matter of Example 16 may optionally include determining the divergence exceeds the threshold, and in response to determining the divergence exceeds the threshold, generating an alert.

In Example 18, the subject matter of one or any combination of Examples 16-17 may optionally include wherein the first plurality of nearest neighbor signals and the second plurality of nearest neighbor signals include fewer signals than the first set of signals and the second set of signals respectively.

In Example 19, the subject matter of one or any combination of Examples 16-18 may optionally include wherein estimating the divergence includes estimating the divergence using distances from a plurality of signals in the first set of signals to a third plurality of nearest neighbor signals in the first set of signals and a fourth plurality of nearest neighbor signals in the second set of signals.

In Example 20, the subject matter of one or any combination of Examples 16-19 may optionally include wherein the first combination of sensors and the second combination of sensors are the same.

In Example 21, the subject matter of one or any combination of Examples 16-20 may optionally include wherein the second set of signals are received immediately preceding the first set of signals.

In Example 22, the subject matter of one or any combination of Examples 16-21 may optionally include wherein estimating the divergence includes estimating a number of additional bits required to code the first set of signals using a code based on the second distribution.

In Example 23, the subject matter of one or any combination of Examples 16-22 may optionally include further comprising, determining the threshold using a target false alarm rate.

In Example 24, the subject matter of one or any combination of Examples 16-23 may optionally include further comprising, determining the target false alarm rate recursively using a ratio of false alarm rates to correct alarm rates.

In Example 25, the subject matter of one or any combination of Examples 16-24 may optionally include wherein the first combination of sensors is selected by a user.

In Example 26, the subject matter of one or any combination of Examples 16-25 may optionally include wherein the second combination of sensors is selected by a user.

In Example 27, the subject matter of one or any combination of Examples 16-26 may optionally include receiving characteristic data from a third combination of sensors at a first period and a second period, the characteristic data representing sensor states, and analyzing the first and second periods to determine a difference between the sensor states of the third combination of sensors at the first period and the second period, and wherein estimating the divergence includes using the determined difference.

In Example 28, the subject matter of one or any combination of Examples 16-27 may optionally include wherein the sensor states includes at least one of a sensor location, a sensor angle, a sensor orientation, a sensor movement, or a sensor operational status.

In Example 29, the subject matter of one or any combination of Examples 16-28 may optionally include receiving characteristic data from the plurality of sensors at a first period and a second period, the characteristic data representing environmental states, and analyzing the first and second periods to determine a difference between the environmental states of the plurality of sensors at the first period and the second period, and wherein estimating the divergence includes using the determined difference.

In Example 30, the subject matter of one or any combination of Examples 16-29 may optionally include wherein the environmental states includes information about at least one of wind speed, temperature, heat index, humidity, movement, luminosity, signal strength, audio, video, chemical composition, or external device functionality.

In Example 31, the subject matter of one or any combination of Examples 16-30 may optionally include at least one machine-readable medium including instructions for receiving information, which when executed by a machine, cause the machine to perform any of the methods of examples 16-30.

In Example 32, the subject matter of one or any combination of Examples 16-31 may optionally include an apparatus comprising means for performing any of the methods of examples 16-30.

Example 33 includes the subject matter embodied by a method for multisensory change detection comprising: means for receiving, at a device, a first set of signals from a first combination of sensors in a plurality of sensors, means for receiving, at the device, a second set of signals from a second combination of sensors in the plurality of sensors, means for determining, at the device, a first distribution for the first set of signals, means for determining, at the device, a second distribution for the second set of signals, means for estimating, at the device, a divergence between the first distribution and the second distribution, wherein the divergence is estimated using the first combination of sensors, the second combination of sensors, a total count of the plurality of sensors, distances from a plurality of signals in the second set of signals to a first plurality of nearest neighbor signals in the first set of signals, and distances from a plurality of signals in the second set of signals to a second plurality of nearest neighbor signals in the second set of signals, and means for determining, at the device, whether the divergence exceeds a threshold.

In Example 34, the subject matter of Example 33 may optionally include determining the divergence exceeds the threshold, and in response to determining the divergence exceeds the threshold, generating an alert.

In Example 35, the subject matter of one or any combination of Examples 33-34 may optionally include wherein the first plurality of nearest neighbor signals and the second plurality of nearest neighbor signals include fewer signals than the first set of signals and the second set of signals respectively.

In Example 36, the subject matter of one or any combination of Examples 33-35 may optionally include wherein estimating the divergence includes estimating the divergence using distances from a plurality of signals in the first set of signals to a third plurality of nearest neighbor signals in the first set of signals and a fourth plurality of nearest neighbor signals in the second set of signals.

In Example 37, the subject matter of one or any combination of Examples 33-36 may optionally include wherein the first combination of sensors and the second combination of sensors are the same.

In Example 38, the subject matter of one or any combination of Examples 33-37 may optionally include wherein the second set of signals are received immediately preceding the first set of signals.

In Example 39, the subject matter of one or any combination of Examples 33-38 may optionally include wherein estimating the divergence includes estimating a number of additional bits required to code the first set of signals using a code based on the second distribution.

In Example 40, the subject matter of one or any combination of Examples 33-39 may optionally include further comprising, determining the threshold using a target false alarm rate.

In Example 41, the subject matter of one or any combination of Examples 33-40 may optionally include further comprising, determining the target false alarm rate recursively using a ratio of false alarm rates to correct alarm rates.

In Example 42, the subject matter of one or any combination of Examples 33-41 may optionally include wherein the first combination of sensors is selected by a user.

In Example 43, the subject matter of one or any combination of Examples 33-42 may optionally include wherein the second combination of sensors is selected by a user.

In Example 44, the subject matter of one or any combination of Examples 33-43 may optionally include receiving characteristic data from a third combination of sensors at a first period and a second period, the characteristic data representing sensor states, and analyzing the first and second periods to determine a difference between the sensor states of the third combination of sensors at the first period and the second period, and wherein the means for estimating the divergence includes using the determined difference.

In Example 45, the subject matter of one or any combination of Examples 33-44 may optionally include wherein the sensor states includes at least one of a sensor location, a sensor angle, a sensor orientation, a sensor movement, or a sensor operational status.

In Example 46, the subject matter of one or any combination of Examples 33-45 may optionally include receiving characteristic data from the plurality of sensors at a first period and a second period, the characteristic data representing environmental states, and analyzing the first and second periods to determine a difference between the environmental states of the plurality of sensors at the first period and the second period, and wherein the means for estimating the divergence includes using the determined difference.

In Example 47, the subject matter of one or any combination of Examples 33-46 may optionally include wherein the environmental states includes information about at least one of wind speed, temperature, heat index, humidity, movement, luminosity, signal strength, audio, video, chemical composition, or external device functionality.

The above detailed description includes references to the accompanying drawings, which form a part of the detailed description. The drawings show, by way of illustration, specific embodiments which can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the embodiments should be determined with reference to the appended claims, along with the full scope of equivalents to which such claims are entitled.

What is claimed is:

1. A multisensory change detection system comprising:
   a communication module to receive a first set of signals from a first combination of sensors in a plurality of sensors and receive a second set of signals from a second combination of sensors in the plurality of sensors; and
   a processing module to:
   determine a first distribution for the first set of signals and a second distribution for the second set of signals;
   estimate a divergence between the first distribution and the second distribution based at least in part on a count of the first combination of sensors, a count of the second combination of sensors, a count of the plurality of sensors, signal value differences from a plurality of signals in the second set of signals to a first plurality of nearest neighbor signals in the first set of signals, and signal value differences from a plurality of signals in the second set of signals to a second plurality of nearest neighbor signals in the second set of signals;
   calculate a target false alarm rate using a training process;
   determine a threshold using the target false alarm rate; and
   determine whether the divergence exceeds the threshold.

2. The system of claim 1, wherein the processing module is further to generate an alert in response to determining the divergence exceeds the threshold.

3. The system of claim 1, wherein the first plurality of nearest neighbor signals and the second plurality of nearest neighbor signals include fewer signals than the first set of signals and the second set of signals respectively.

4. The system of claim 1, wherein the divergence is estimated using signal value differences from a plurality of signals in the first set of signals to a third plurality of nearest neighbor signals in the first set of signals and a fourth plurality of nearest neighbor signals in the second set of signals.

5. The system of claim 1, wherein the first combination of sensors and the second combination of sensors are the same.

6. The system of claim 1, wherein the second set of signals are received immediately preceding the first set of signals.

7. The system of claim 1, wherein to estimate the divergence, the processing module is further to estimate a number of additional bits required to code the first set of signals using a code based on the second distribution.

8. The system of claim 1, wherein the processing module is to determine the target false alarm rate recursively using a ratio of false alarm rates to correct alarm rates.

9. The system of claim 1, wherein the second combination of sensors is selected by a user.

10. The system of claim 1, wherein the communication module is further to receive characteristic data from a third combination of sensors at a first period and a second period, the characteristic data representing sensor states;
    wherein the processing module is further to analyze the first and second periods to determine a difference between the sensor states of the third combination of sensors at the first period and the second period; and
    wherein the processing module is to use the determined difference to estimate the divergence.

11. The system of claim 10, wherein the sensor states includes at least one of a sensor location, a sensor angle, a sensor orientation, a sensor movement, or a sensor operational status.

12. The system of claim 1, wherein the communication module is further to receive characteristic data from the plurality of sensors at a first period and a second period, the characteristic data representing environmental states;

wherein the processing module is further to analyze the first and second periods to determine a difference between the environmental states of the plurality of sensors at the first period and the second period; and wherein the processing module is to use the determined difference to estimate the divergence.

13. The system of claim 12, wherein the environmental states includes information about at least one of wind speed, temperature, heat index, humidity, movement, luminosity, signal strength, audio, video, chemical composition, or external device functionality.

14. The system of claim 1, wherein the first combination of sensors is selected by a user.

15. A method for multisensory change detection comprising:
receiving, at a device, a first set of signals from a first combination of sensors in a plurality of sensors;
receiving, at the device, a second set of signals from a second combination of sensors in the plurality of sensors;
determining, at the device, a first distribution for the first set of signals;
determining, at the device, a second distribution for the second set of signals;
estimating, at the device, a divergence between the first distribution and the second distribution based at least in part on the first combination of sensors, the second combination of sensors, a total count of the plurality of sensors, signal value differences from a plurality of signals in the second set of signals to a first plurality of nearest neighbor signals in the first set of signals, and signal value differences from a plurality of signals in the second set of signals to a second plurality of nearest neighbor signals in the second set of signals;
calculating a target false alarm rate using a training process;
determining a threshold using the target false alarm rate; and
determining, at the device, whether the divergence exceeds the threshold.

16. The method of claim 15, further comprising generating an alert in response to determining the divergence exceeds the threshold.

17. The method of claim 15, further comprising, determining the target false alarm rate recursively using a ratio of false alarm rates to correct alarm rates.

18. The method of claim 15, further comprising:
receiving characteristic data from a third combination of sensors at a first period and a second period, the characteristic data representing sensor states or environmental states; and
analyzing the first and second periods to determine a difference between the sensor states or the environmental states of the third combination of sensors at the first period and the second period; and
wherein estimating the divergence includes using the determined difference.

19. The method of claim 18, wherein the sensor states includes at least one of a sensor location, a sensor angle, a sensor orientation, a sensor movement, or a sensor operational status.

20. The method of claim 18, wherein the environmental states includes information about at least one of wind speed, temperature, heat index, humidity, movement, luminosity, signal strength, audio, video; chemical composition, or external device functionality.

21. The method of claim 15, further comprising:
receiving characteristic data from the plurality of sensors at a first period and a second period, the characteristic data representing environmental states;
analyzing the first and second periods to determine a difference between the environmental states of the plurality of sensors at the first period and the second period; and
using the determined difference to estimate the divergence.

22. At least one non-transitory machine-readable medium including instructions for receiving information, which when executed by a machine, cause the machine to:
receive, at the machine, a first set of signals from a first combination of sensors in a plurality of sensors;
receive, at the machine, a second set of signals from a second combination of sensors in the plurality of sensors;
determine, at the machine, a first distribution for the first set of signals;
determine, at the machine, a second distribution for the second set of signals;
estimate, at the machine, a divergence between the first distribution and the second distribution based at least in part on the first combination of sensors, the second combination of sensors, a total count of the plurality of sensors, signal value differences from a plurality of signals in the second set of signals to a first plurality of nearest neighbor signals in the first set of signals and signal value differences from a plurality of signals in the second set of signals to a second plurality of nearest neighbor signals in the second set of signals;
calculate a target false alarm rate using a training process;
determine a threshold using the target false alarm rate; and
determine, at the machine, whether the divergence exceeds the threshold.

23. The at least one non-transitory machine-readable medium of claim 22, further comprising operations to generate an alert in response to determining the divergence exceeds the threshold.

24. The at least one non-transitory machine-readable medium of claim 22, further comprising operations to:
receive characteristic data from the plurality of sensors at a first period and a second period, the characteristic data representing environmental states;
analyze the first and second periods to determine a difference between the environmental states of the plurality of sensors at the first period and the second period; and
use the determined difference to estimate the divergence.

25. The at least one non-transitory machine-readable medium of claim 24, wherein the environmental states includes information about at least one of wind speed, temperature, heat index, humidity, movement, luminosity, signal strength, audio, video, chemical composition, or external device functionality.

* * * * *